United States Patent [19]

Matsuyama et al.

[11] 3,988,513

[45] Oct. 26, 1976

[54] SILVER HALIDE EMULSIONS FOR RECORDING ELECTRON RAYS

[75] Inventors: Junichi Matsuyama; Akira Sato; Yosuke Nakajima; Yoshiyuki Nakazawa, all of Minami-ashigara, Japan

[73] Assignee: Fuji Photo Film Co., Ltd., Minami-ashigara, Japan

[22] Filed: Mar. 20, 1975

[21] Appl. No.: 560,053

Related U.S. Application Data

[60] Division of Ser. No. 324,273, Jan. 17, 1973, which is a continuation-in-part of Ser. No. 160,181, July 6, 1971, abandoned.

[30] Foreign Application Priority Data

July 6, 1970 Japan.............................. 45-58880

[52] U.S. Cl.................................. 427/43; 96/137; 250/475; 346/1
[51] Int. Cl.$^2$.......................................... B05D 3/06
[58] Field of Search................... 96/27 E, 45.2, 137, 96/82; 427/43

[56] References Cited
UNITED STATES PATENTS

| | | | |
|---|---|---|---|
| 3,303,341 | 2/1967 | Fram et al. ............................ | 96/82 |
| 3,706,566 | 12/1972 | Shiba et al. ............................ | 96/137 |
| 3,706,570 | 12/1972 | Nakazawa et al. ..................... | 96/137 |
| 3,826,656 | 7/1974 | Jenkins et al. ......................... | 96/137 |

*Primary Examiner*—J. Travis Brown
*Attorney, Agent, or Firm*—Sughrue, Rothwell, Mion, Zinn and Macpeak

[57] ABSTRACT

A silver halide emulsion for recording electron rays which comprises a silver halide emulsion containing silver halide grains having an average particle size below 0.2 microns and at least one sensitizing dye represented by the following formula:

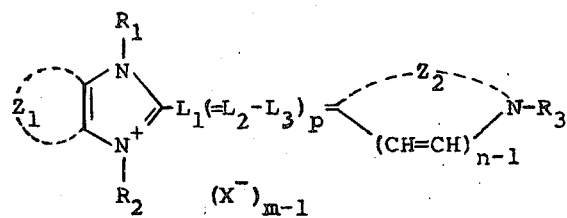

wherein $Z_1$ represents a group of atoms necessary to form a benzene ring or naphthalene ring, said benzene or naphthalene ring being substituted or unsubstituted, $Z_2$ represents a group of atoms necessary to form a 5-member or 6-member heterocyclic nucleus, $R_1$, $R_2$ and $R_3$ each represents an alkyl group, a substituted alkyl group or an aryl group, $L_1$, $L_2$ and $L_3$ each represents a methine group or a substituted methine group, said $R_1$ and $L_1$, $R_2$ and $L_1$ or $R_3$ and $L_3$ may be linked by an alkylene group, $m$ and $n$ each represents 1 or 2, X represents an acid anion, and $p$ represents 1 or 2, is disclosed.

6 Claims, No Drawings

SILVER HALIDE EMULSIONS FOR RECORDING ELECTRON RAYS

CROSS-REFERENCE TO RELATED APPLICATIONS

This is a division of application Ser. No. 324,273, filed Jan. 17, 1973; which in turn is a continuation-in-part application of copending application Ser. No. 160,181, filed July 6, 1971, now abandoned.

BACKGROUND OF THE INVENTION

1. Field of the Invention

The present invention relates to silver halide photographic emulsions. In more detail, the present invention relates to fine-grain photographic silver halide emulsions of which an electron sensitivity has been remarkably increased by use of specific sensitizing dyes.

2. Description of the Prior Art

It has been well known to expand the light sensitive wavelength of silver halide emulsions by adding a certain kind of sensitizing dye in the art of preparation of the silver halide photographic emulsions.

It has also been previously found that the sensitive wavelength range of the emulsions of finely divided particles having a particle size of 0.2 microns not only is expanded when spectrally sensitized with using a certain kind of dye but also the light sensitivity of an intrinsic absorption range of the silver halide is expanded as disclosed in Japanese Patent Application No. 44-38248 U.S. Patent Application Ser. No. 38,485, filed May 18, 1970.)

On the other hand, it is required to reduce the grain size of the silver halide as small as possible in order to obtain high quality images in sensitive materials for high resolution recording and especially in sensitive materials for recording electron rays. Further, it is necessary to use emulsions having an electron sensitivity as high as possible in order to reduce electric charges on the surface of the sensitive material and to draw distinct images by reducing the amount of the electron rays so as to increase the speed of the electron ray recording.

One prior art technique for recording electron rays, for example, using the emulsions disclosed in U.S. Pat. Nos. 2,912,329; 3,173,791, and 3,264,110 and British Pat. No. 980,234, has the disadvantage that the electron ray must be converted to the visible ray corresponding to the intrinsic sensitivity of the gelatino silver halide photographic emulsion used for recordation using an intensifying screen.

SUMMARY OF THE INVENTION

The inventors have found the fact that the electron sensitivity increases by adding specific sensitizing dyes to emulsions containing silver halide crystals having an average particle size of less than 0.2 microns.

An object of the present invention is to provide silver halide emulsions having an increased electron sensitivity by adding specific sensitizing dyes to silver halide emulsions of the above-described finely divided grains.

Another object of this invention to provide an electron ray sensitive silver halide emulsion which can be used without the necessity of using an electron ray intensifying screen as described above.

The above-described objects have been attained by using dyes represented by the following formula:

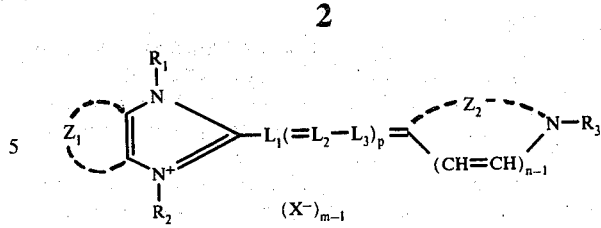

wherein $Z_1$ represents a group of atoms necessary to form a benzene ring or naphthalene ring. The hydrogen atoms of the benzene ring or naphthalene ring may be replaced by substituents. Such substituents include, for example, a halogen atom, an alkoxy group, a hydroxy group, a nitrile group, an acetyl group, an ester group, a carboxyl group, a trifluoromethyl group, an amino group, an acetylamino group, an alkyl sulfonyl group, an alkylamino sulfonyl group, a sulfamyl group, an acetylene group and an aryl group.

$Z_2$ represents a group of atoms necessary to form a 5-member or a 6-member heterocyclic nucleus. Such heterocyclic nuclei include, for example, a thiazoline nucleus, an oxazoline nucleus, a thioazole nucleus, an oxazole nucleus, a benzothiazole nucleus, a naphthothiazole nucleus, a benzoxazole nucleus, a naphthoxazole nucleus, a benzoselenazole nucleus, a naphthoselenazole nucleus, an indolenine nucleus, a benzoindolenine nucleus, an imidazole nucleus, a benzoimidazole nucleus, a naphthoimidazole nucleus, a 2-quinoline nucleus, a 2-benzoquinoline nucleus, a 4-quinoline nucleus, a 4-benzoquinoline nucleus, a 2-pyridine nucleus and a 4-pyridine nucleus.

$R_1$, $R_2$ and $R_3$ each represents an alkyl group (for example, an unsubstituted alkyl group, for example, a methyl group, an ethyl group, an n-propyl group, an n-butyl group, and a cyclohexyl group or a substituted alkyl group, for example, a $\beta$-hydroxyethyl group, a $\beta$-acetoxyethyl group, a $\gamma$-acetoxypropyl group, a $\beta$-methoxyethyl group, a $\beta$-carboxyethyl group, a $\gamma$-carboxypropyl group, a $\delta$-carboxybutyl group, an $\omega$-carboxypentyl group, a $\beta$-ethoxycarbonylethyl group, a $\beta$-sulfoethyl group, a $\gamma$-sulfopropyl group, a $\gamma$-sulfobutyl group a $\delta$-sulfobutyl group, a vinylmethyl group, a p-carboxybenzyl group, a p-carboxyphenethyl group, a p-sulfobenzyl group and a p-sulfophenethyl group or an aryl group. $R_1$ and $L_1$, $R_2$ and $L_1$ or $R_3$ and $L_3$ may be linked by an alkylene group (for example, an ethylene group or a trimethylene group). $L_1$, $L_2$ and $L_3$ each represents a methine group or substituted methine group, n represents 1 or 2, X represents an acid anion, m represents 1 or 2, and p represents 1 or 2.

DETAILED DESCRIPTION OF THE INVENTION

A characteristic of the sensitizing dyes used in the present invention on chemical structure is that one of the heterocyclic nuclei of the cyanine dye is an imidazole nucleus, i.e., a benzimidazole nucleus or a naphthoimidazole nucleus.

It has been found that the electron sensitivity is remarkably increased by exposure of the electron rays when using sensitizing dyes having such a specific structure in silver halide emulsions of finely divided particles of an average particle size of less than 0.2 microns.

For the purpose of increasing the electron sensitivity, it is not necessary to expand the spectral sensitive range of the silver halide to a longer wavelength. But, rather, it is preferable to use one having a short methine chain which has a small expansion of the longer wavelength in view of the safety of the sensitive materials.

The silver halide emulsions used in the present invention comprise gelatin or synthetic polymers as the binder. Though any of a silver chloride, a silver bromide, a silver iodide, a silver chloride bromide, a silver iodide bromide, and a silver chloride iodide bromide may be used, a silver bromide or silver iodide bromide emulsion exhibits excellent results.

In order to prepare the emulsions of the present invention, though dyes of the present invention may be added to silver halide emulsions produced previously by the conventional method, the same effect is obtained by adding at a step of forming the silver halide crystals, a physical ripening step or a chemical sensitization step. The silver halide emulsions may be sensitized by sulfur compounds and gold complex salts or not sensitized. Other materials such as chemical sensitizers, stabilizers, antifogging agents, tone adjusting agents, hardeners, surface active agents, plasticizers, developing accelerators, color couplers and fluorescent whitening agents may be used together by conventional methods.

An amount of the dyes used in the present invention is in a range of $10^{-7}$ to $10^{-3}$ mols/mol AgX. Although sensitization effect is shown with increase of the amount, less than $10^{-4}$ mols/mol AgX is preferable in view of the remaining color of the sensitive material after treatment.

The sensitizing dyes used in the present invention are all known compounds, which can be easily synthesized by persons skilled in the art by referring to, for example, Belgian Pat. No. 510948, British Pat. No. 505979, British Pat. No. 815172, British Pat. No. 871936, British Pat. No. 776050, British Pat. No. 955,962 and British Pat. No. 955,964, Belgian Pat. No. 640453, Belgian Pat. No. 648991, British Pat. No. 975504, British Pat. No. 979251, British Pat. No. 981453, Belgian Pat. Spec. No. 648981, U.S. Pat. No. 3,243,298, Japanese Patent Publication No. 43-14497, corresponding to Belgian Pat. No. 697,009, British Pat. No. 1062950, Japanese Patent Publication No. 43-4931, corresponding to Belgian Pat. No. 688,528, and U.S. Pat. No. 3,615,638.

In the following chemical formulas of sensitizing dyes used in the present invention, are shown. Although the present invention is explained in detail with reference to examples thereof, the sensitizing dyes used in the present invention are not to be interpreted as limited thereby.

Examples of compounds:

1.
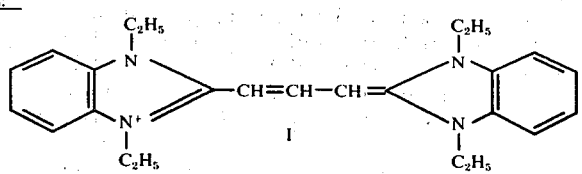

2.
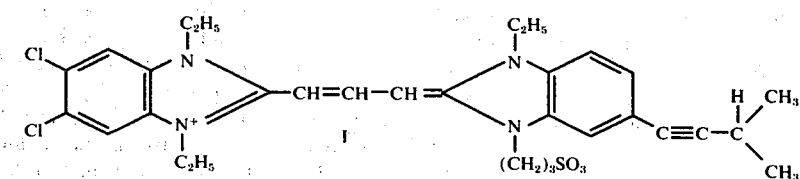

3.
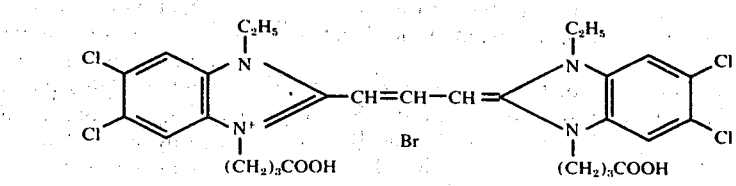

4.
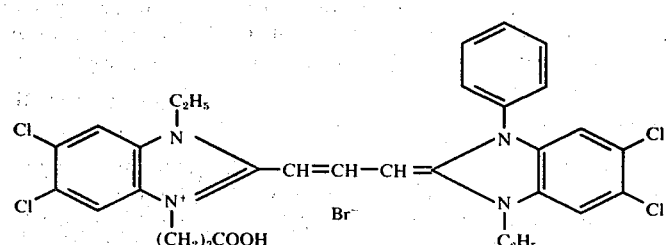

5.
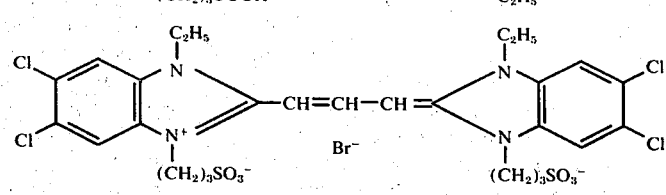

-continued
Examples of compounds:
6. 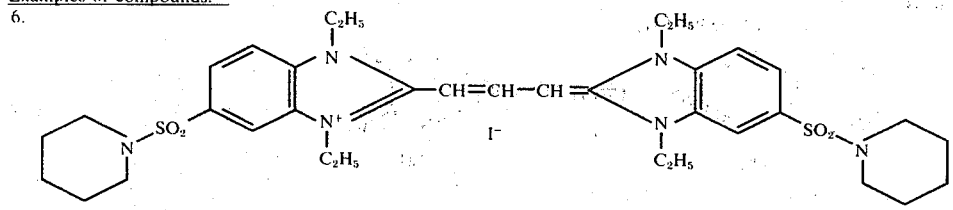
7. 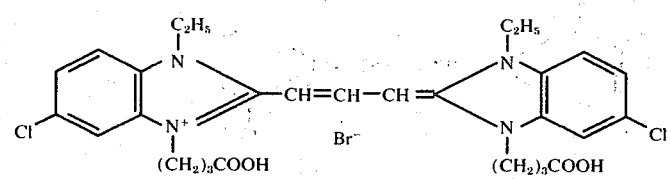
8. 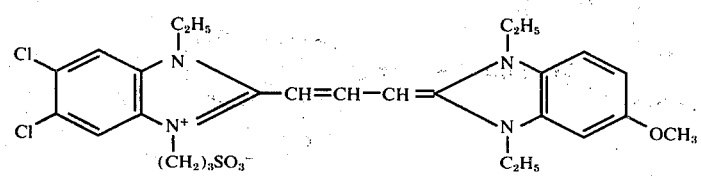
9. 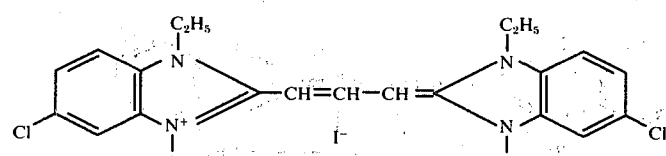
10. 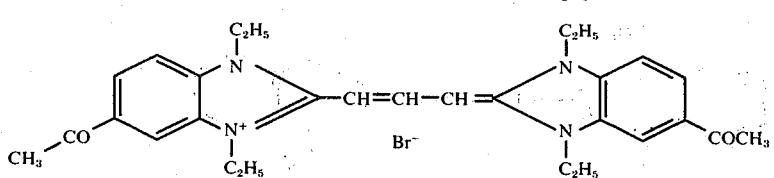
11. 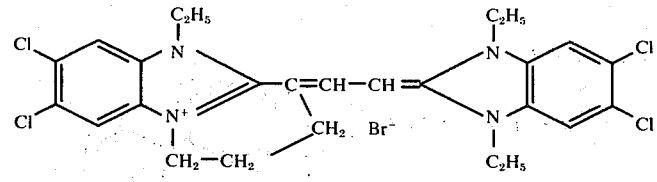
12. 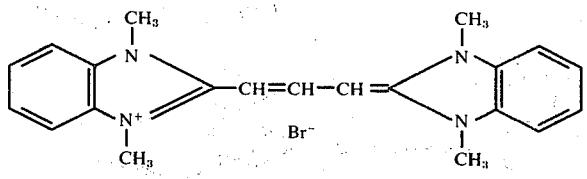
13. 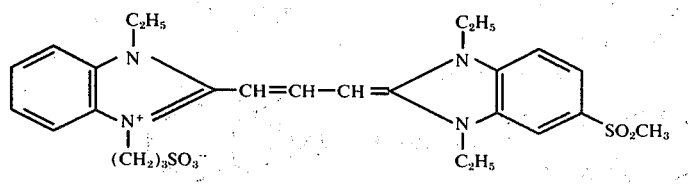
14. 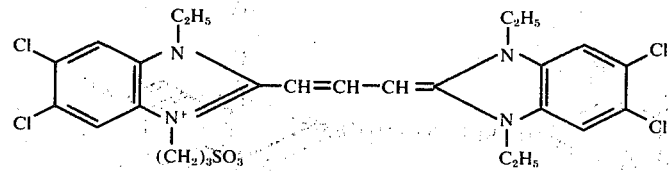

Examples of compounds:
15. 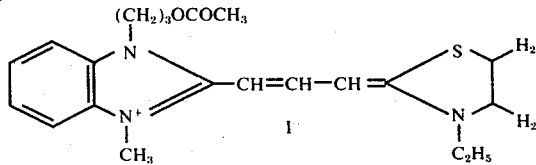
16. 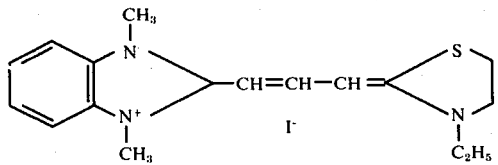
17. 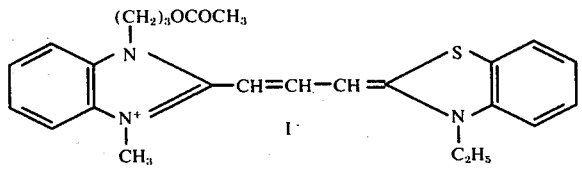
18. 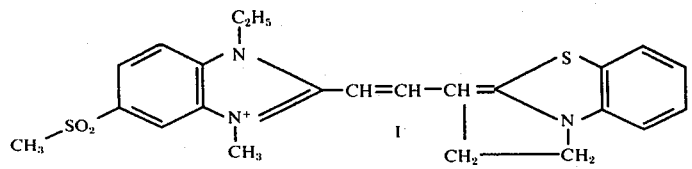
19. 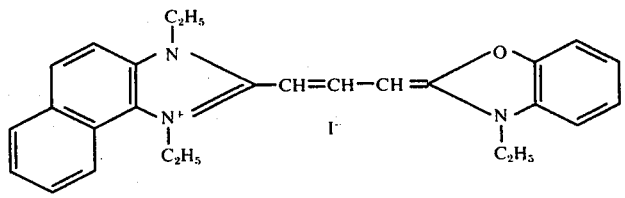
20. 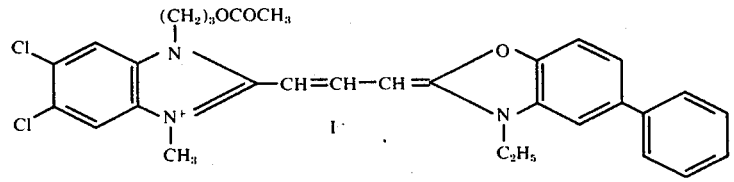
21. 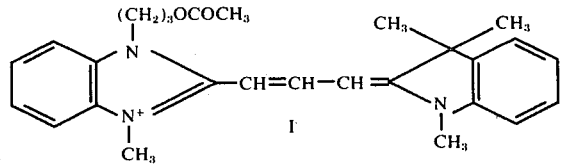
22. 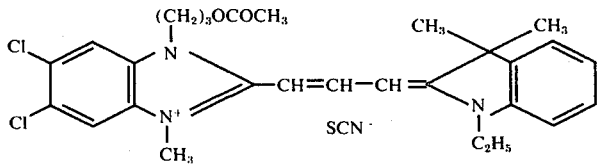
23. 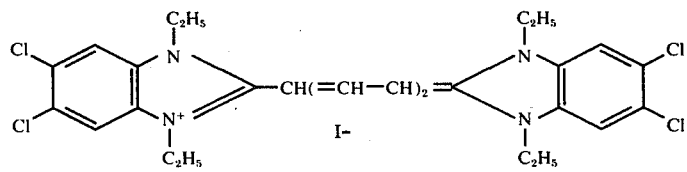

EXAMPLE 1

A silver iodide bromide emulsion having an average particle size of 0.08 μ (silveriodide: 0.2 mol %) was prepared by a conventional method. After sulfur sensitization and gold sensitization, the sample was divided into two parts. To cellulose triacetate film bases a part of the divided sample was applied solely and the other part was applied after adding dyes of the present invention. After exposing to an electron ray radiation apparatus (JEM-5G, manufactured by Japan Electron Optics Laboratory Co., Ltd.) at 50 KV of acceleration voltage ($\lambda \doteq 5.48 \times 10^{-2}$ A) with varying stepwise the amount of radiation in a range of $10^{-10}$ to $10^{-8}$ coulombs/cm² of beam current density, the samples were developed, by which a sensitometry curve was determined. In the following, the sentization ratio of the samples to which dyes are added is shown as the logarithm as compared with the samples to which dyes are not added.

In order to compare, three kinds of dyes outside the dyes of the present invention were added.

Comparison Compounds:
1. Thiazole Nucleus

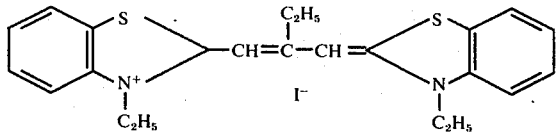

2. Oxazole Nucleus

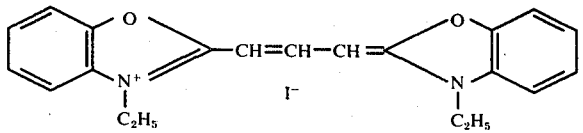

3. Indoline Nucleus

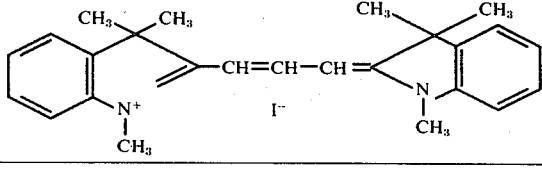

TABLE 1

Results of Electron Ray Sensitometry

| Compound No. | Amount of Addition cc/0.1 M AgX | Ratio of Sensitization* log E | Fog | Note |
|---|---|---|---|---|
| — | — | — | 0.03 | |
|  | M/1000 solution |  |  | |
| 1 | 10 cc | 0.07 | 0.03 | Condition of electron ray radiation: |
| 2 | 5 | 0.10 | 0.05 | Acceleration |
| 3 | 10 | 0.13 | 0.05 | voltage: 50 KV |
| 4 | 5 | 0.17 | 0.03 | Electron ray density: $10^{-10}$ to $10^{-8}$ coulombs/cm² |
| 5 | 5 | 0.17 | 0.03 | |
| 6 | 5 | 0.19 | 0.03 | |
| 7 | 10 | 0.13 | 0.05 | |
| 8 | 10 | 0.11 | 0.04 | |
| 9 | 10 | 0.36 | 0.03 | |
| 10 | 10 | 0.47 | 0.03 | |
| 11 | 10 | 0.19 | 0.04 | |
| 12 | 10 | 0.12 | 0.03 | |
| 13 | 5 | 0.27 | 0.03 | |
| 14 | 10 | 0.16 | 0.03 | |
| 15 | 10 | 0.22 | 0.03 | |
| 16 | 5 | 0.11 | 0.03 | |
| 17 | 5 | 0.40 | 0.03 | |
| 18 | 5 | 0.38 | 0.03 | |
| 19 | 10 | 0.20 | 0.03 | |
| 20 | 5 | 0.11 | 0.03 | |
| 21 | 10 | 0.18 | 0.03 | |
| 22 | 2.5 | 0.50 | 0.08 | |
| 23 | 10 | 0.05 | 0.03 | |
| Comparison: | | | | |
| 1 | 10 | 0.03 | 0.04 | |
| 2 | 10 | −0.10 | 0.02 | |
| 3 | 10 | 0.03 | 0.03 | |

*Ratio of sensitization to sensitivity of a non-addition emulsion (density 0.3)

EXAMPLE 2

The following shows the effect of the average particle size of the silver halide in the emulsion of the electron ray sensitivity using the sensitizing dyes of this invention. Preparation of the emulsion:

As shown in Table 2 below, into the first solutions A–E, the second and the third solutions set forth in Table 2 below were added gradually for 10 minutes while keeping the silver electrode potential at +40 mV.

TABLE 2

| Composition | Solutions | | | | |
|---|---|---|---|---|---|
| | A | B | C | D | E |
| First Solution: | | | | | |
| Potassium Bromide (g) | 0.7 | 1.0 | 2.0 | 3.5 | 7.0 |
| Gelatin (g) | 7.0 | 7.0 | 7.0 | 7.0 | 7.0 |
| Water (c.c.) | 700 | 700 | 700 | 700 | 700 |
| Second Solution: | | | | | |
| Silver Nitrate 100 g | | | | | |
| Water 500 c.c. | | | | | |
| Third Solution: | | | | | |
| Potassium Bromide 70 g | | | | | |
| Potassium Iodide 2 g | | | | | |
| Water 500 c.c. | | | | | |

The thus obtained five solutions A–E were subjected to desalting in accordance with a conventional flocculation. After a sulfur sensitization and gold sensitization, using conventional techniques, a chemical ripening was done for 50 minutes. The thus processed solutions were dispersed in a solution having dissolved therein 50 g of gelatin in 500 g of water to prepare emulsions A–E. These emulsions A–E were divided into two parts. Into only one part, 10 cc of an aqueous solution of 0.001 mol of the sensitizing dye (Compound 10) of the present invention per 0.1 mol of silver halide was added.

These ten emulsions were applied to polyethylene terephthalate film bases to prepare samples. The samples were exposed by an electron ray radiation apparatus and the sensitometry curve determined in the same manner as disclosed in Example 1. The sensitization ratio of the samples to which the dyes were added as shown by the logarithm in comparison with the samples to which dyes were not added was determined ($\Delta$ log E). The results contained in Table 3 below shows the relationship of the sensitization ratio and the average particle size.

TABLE 3

| Emulsion | Samples | | | | |
|---|---|---|---|---|---|
| | A | B | C | D | E |
| Particle Size ($\mu$) | 0.06 | 0.10 | 0.20 | 0.25 | 0.32 |
| $\Delta$ log E | +0.63 | +0.41 | +0.23 | +0.02 | +0.01 |

From the above results, it can be seen that the sensitizing dye markedly improves the X-ray sensitivity when the particle size of the silver halide is less than 0.2 $\mu$.

While the invention has been described in detail and in terms of specific embodiments thereof it will be apparent to one skilled in the art that various changes and modifications can be made therein without departing from the spirit and scope thereof.

What is claimed is:

1. A process for recording electron rays which comprises imagewise exposing to electron ray radiation a silver halide emulsion coated on a base and containing silver halide grains having an average particle size of less than 0.2 microns and at least one sensitizing dye represented by the following formula:

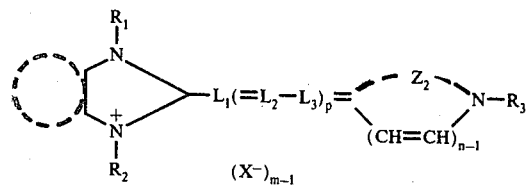

wherein $Z_1$ represents a group of atoms necessary to form a benzene ring or naphthalene ring, $Z_2$ represents a group of atoms necessary to form a 5-member or 6-member heterocyclic nucleus of the type conventionally used in sensitizing cyanine dyes and which does not deteriorate the sensitivity to electron rays of said sensitizing dye, said five-member or six-member heterocyclic nucleus being selected from the group consisting of a thiazoline nucleus, an oxazoline nucleus, a thiazole nucleus, an oxazole nucleus, a benzothiazole nucleus, a naphthothiazole nucleus, a benzoxazole nucleus, a naphthoxazole nucleus, a benzoselenazole nucleus, a naphthoselenazole nucleus, an indolenine nucleus, a benzoindolenine nucleus, an imidazole nucleus, a benzoimidazole nucleus, a naphthoimidazole nucleus, a 2-quinoline nucleus, a 2-benzoquinoline nucleus, a 4-quinoline nucleus, a 4-benzoquinoline nucleus, a 2-pyridine nucleus, and a 4-pyridine nucleus, $R_1$, $R_2$ and $R_3$ each represents an alkyl group, or an aryl group, $L_1$, $L_2$ and $L_3$ each represents a methine group, said $R_1$ and $L_1$, $R_2$ and $L_1$ or $R_3$ and $L_3$ may be linked by an alkylene group, $m$ and $n$ each represents 1 or 2, X represents an acid anion, and $p$ represents 1 or 2.

2. The process of claim 1, wherein said benzene ring or naphthalene ring is a substituted benzene ring or substituted naphthalene ring and wherein said substituents are selected from the group consisting of a halogen atom, an alkoxy group, a hydroxy group, a nitrile group, an acetyl group, an ester group, a carboxyl group, a trifluoromethyl group, an amino group, an acetylamino group, an alkyl sulfonyl group, an alkylamino sulfonyl group, a sulfamyl group, an acetylene group and an aryl group.

3. The process of claim 1, wherein said alkyl group is selected from the group consisting of a methyl group, an ethyl group, a propyl group, a butyl group and a cyclohexyl group.

4. The process of claim 1, wherein said alkyl group is a substituted alkyl group, said substituents being selected from the group consisting of a β-hydroxyethyl group, a β-acetoxyethyl group, a γ-acetoxypropyl group, a β-methoxyethyl group, a β-carboxyethyl group, a γ-carboxypropyl group, a δ-carboxybutyl group, an ω-carboxypentyl group, a β-ethoxycarbonylethyl group, a β-sulfoethyl group, a γ-sulfopropyl group, a γ-sulfobutyl group, a δ-sulfobutyl group, a vinylmethyl group, a p-carboxybenzyl group, a p-carboxyphenethyl group, a p-sulfobenzyl group and a p-sulfophenethyl group.

5. The process of claim 1, wherein said silver halide emulsion is selected from the group consisting of a silver chloride, a silver bromide, a silver iodide, a silver chloride bromide, a silver iodide bromide, and a silver chloride iodide bromide emulsion.

6. The process of claim 1, wherein said dye is present at a level of from $10^{-7}$ to $10^{-3}$ moles per mole of silver halide.

\* \* \* \* \*